(12) United States Patent
Suzuki et al.

(10) Patent No.: US 7,512,105 B2
(45) Date of Patent: Mar. 31, 2009

(54) ROUTING METHOD AND MOBILE TERMINAL

(75) Inventors: Toshihiro Suzuki, Yokohama (JP); Motonari Kobayashi, Yokohama (JP); Ashiq Khan, Yokosuka (JP); Ratapon Satrusajang, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 332 days.

(21) Appl. No.: 11/327,502

(22) Filed: Jan. 9, 2006

(65) Prior Publication Data

US 2006/0171366 A1 Aug. 3, 2006

(30) Foreign Application Priority Data

Jan. 7, 2005 (JP) ............................ P2005-002937

(51) Int. Cl.
*H04Q 7/24* (2006.01)
*H04L 12/28* (2006.01)

(52) U.S. Cl. ...................... 370/338; 370/389; 370/392

(58) Field of Classification Search .................. 370/338, 370/389, 349, 315, 392, 395.3
See application file for complete search history.

(56) References Cited

OTHER PUBLICATIONS

Sergio Marti, et al., "Mitigating Routing Misbehavior in Mobile Ad Hoc Networks", Mobicom, 2000, 11 pages.

C. Perkins, et al., "Ad hoc On-Demand Distance Vector (AODV) Routing", Network Working Group, Request for Comments: 3561, Category: Experimental, Jul. 2003, pp. 1-37.

Hugo Miranda, et al., "Friends and Foes: Preventing Selfishness in Open Mobile Ad Hoc Networks", Multimedia Signal Processing, IEEE, XP-010642410, May 19, 2003, pp. 440-445.

Qi He, et al., "Sori: a Secure and Objective Reputation-based Incentive Scheme for Ad-hoc Networks", Wireless Communications and Networking Conference, IEEE, XP-010708419, vol. 2, Mar. 21, 2004, pp. 825-830.

Sonja Buchegger, et al., "Performance Analysis of the Confidant Protocol (Cooperation Of Nodes: Fairness in Dynamic Ad-hoc Ne Tworks)", Proceedings of the Third ACM International Symposium on Mobile Ad Hoc Networking and Computing, XP-002369769, Jun. 9-11, 2002, pp. 226-236.

Shayan Ghazizadeh, et al., "Security-Aware Adaptive Dynamic Source Routing Protocol", Proceedings of the Local Computer Networks, IEEE, XP-010628240, Nov. 6, 2002, pp. 751-760.

*Primary Examiner*—George Eng
*Assistant Examiner*—Michael Faragalla
(74) *Attorney, Agent, or Firm*—Oblon, Spivak, McClelland, Maier & Neustadt, P.C.

(57) ABSTRACT

A routing method in an ad hoc network formed by a plurality of mobile terminals includes receiving, at a mobile terminal forming part of the ad hoc network, a packet generated by an adjacent terminal, and determining, at the mobile terminal, whether to relay the received packet or not, based on presence or absence of a record of packet relaying by the adjacent terminal.

10 Claims, 7 Drawing Sheets

FIG. 3
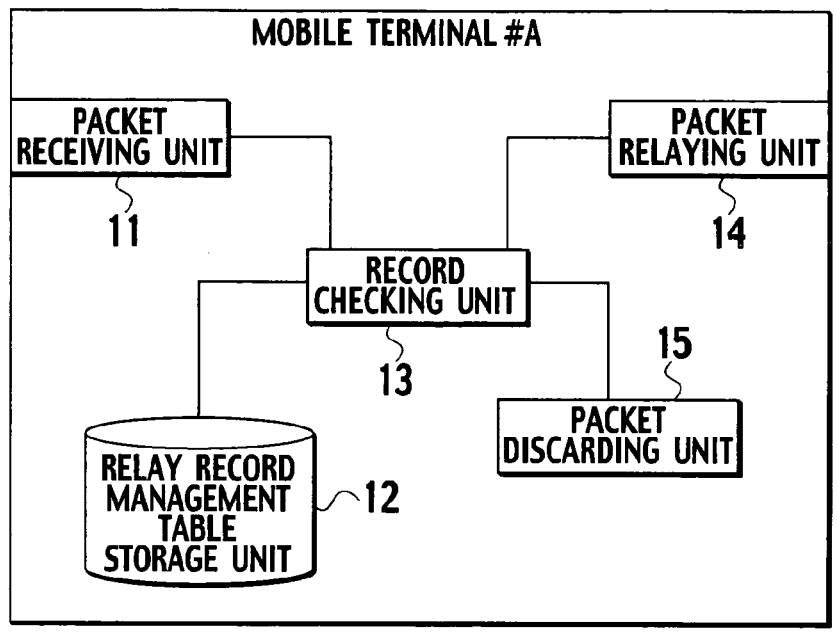
FIG. 4A
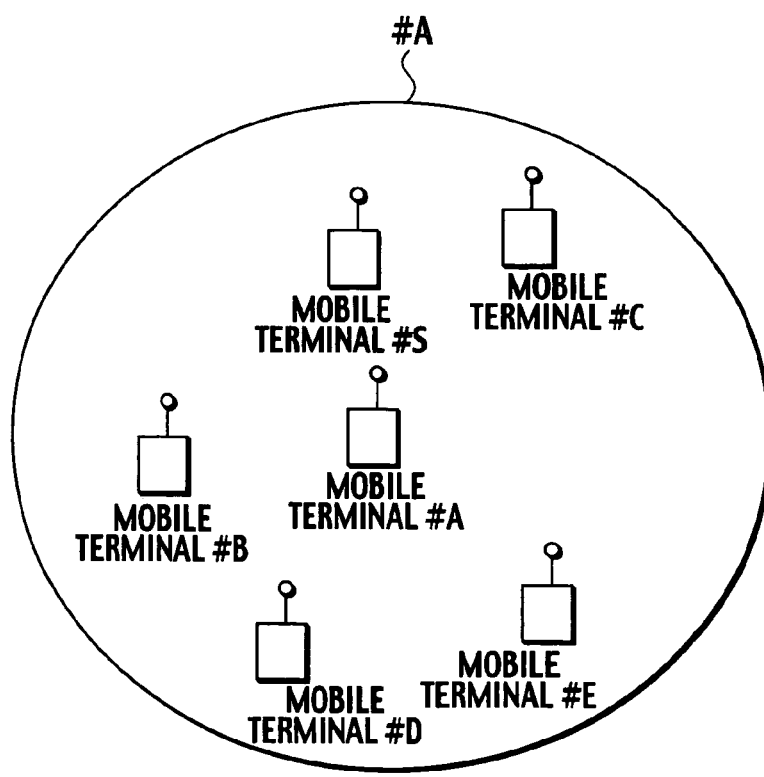
FIG. 4B
| MOBILE TERMINAL ID | RELAY RECORD |
|---|---|
| #B | PRESENT |
| #D | PRESENT |

US 7,512,105 B2

ROUTING METHOD AND MOBILE TERMINAL

CROSS REFERENCE TO RELATED APPLICATION

This application is based upon and claims the benefit of priority from the prior Japanese Patent Application No. P2005-002937, filed on Jan. 7, 2005; the entire contents of which are incorporated herein by reference.

BACKGROUND OF THE INVENTION

1. Field of the Invention

The present invention relates to a routing method in an ad hoc network formed by a plurality of mobile terminals, and mobile terminals for implementing the routing method.

2. Description of the Related Art

A method in an ad hoc network for identifying an uncooperative terminal and excluding the identified uncooperative terminal, thereby avoiding being affected by the uncooperative terminal has been known.

Here, an uncooperative terminal means a selfish user's mobile terminal which does not relay packets generated by other mobile terminals but transmits packets generated by itself, or a malicious user's mobile terminal which intentionally discards packets generated by other mobile terminals.

With reference to FIGS. 1 and 2, an example of a conventional method for avoiding being affected by an uncooperative terminal in an ad hoc network will be described.

With FIG. 1, an example of using a "watchdog technique" for monitoring every packet in radio-wave-reaching areas, utilizing radio characteristics, in an ad hoc network formed by a plurality of mobile terminals #A to #F will be described.

As shown in FIG. 2, in step S1001, the mobile terminals #A to #F forming the ad hoc network monitor every packet in their respective radio-wave-reaching areas #A to #F.

In step S1002, when a mobile terminal detects an uncooperative terminal, it reports information on the uncooperative terminal throughout the ad hoc network.

In step S1003, all the mobile terminals in the ad hoc network share the reported information on the uncooperative terminal, and exclude the uncooperative terminal from the ad hoc network.

The conventional method, however, identifies an uncooperative terminal and excludes the identified uncooperative terminal from the ad hoc network, thereby, thereafter, to avoid being affected by the uncooperative terminal.

That is, the conventional method excludes an uncooperative terminal after identifying it, thus having the problem that it allows selfish communication of the uncooperative terminal (is affected by the uncooperative terminal) before exclusion.

Also, the conventional method has the problem that since a plurality of mobile terminals forming an ad hoc network need to monitor every packet in their respective radio-wave-reaching areas, a processing load is increased.

Also, the conventional method has the problem that since information on an uncooperative terminal is propagated throughout an ad hoc network, a network load is increased.

In addition, since information on an uncooperative terminal is shared and processed by all the mobile terminals in an ad hoc network, there is the problem of increased processing areas.

BRIEF SUMMARY OF THE INVENTION

The present invention has been made in view of the above problems, and has an object of providing a routing method which can allow only mobile terminals with packet relay (cooperation) records to join in an ad hoc network, thereby to avoid being affected by uncooperative terminals, and mobile terminals for implementing the routing method.

A first aspect of the present invention is summarized as a routing method in an ad hoc network formed by a plurality of mobile terminals, including receiving, at a mobile terminal forming part of the ad hoc network, a packet generated by an adjacent terminal; and determining, at the mobile terminal, whether to relay the received packet or not, based on presence or absence of a record of packet relaying by the adjacent terminal.

In the first aspect of the present invention, the routing method may include starting, at the mobile terminal, management of the record of packet relaying by the adjacent terminal when receiving a packet relayed by the adjacent terminal.

In the first aspect of the present invention, the mobile terminal may manage a record of data packet relaying by the adjacent terminal and a record of control packet relaying by the adjacent terminal, separately.

In the first aspect of the present invention, the routing method may include discarding, at the mobile terminal, a control packet relayed by the adjacent terminal when there is no record of data packet relaying by the adjacent terminal.

In the first aspect of the present invention, the routing method may include transmitting, at the adjacent terminal, a request signal for requesting the mobile terminal to manage a record of packet relaying by the adjacent terminal, and managing, at the mobile terminal, the record of packet relaying by the adjacent terminal for a predetermined period of time in response to the request signal.

A second aspect of the present invention is summarized as a mobile terminal forming part of an ad hoc network, including a relay record managing unit configured to manage a record of packet relaying by a terminal adjacent to the mobile terminal; a packet receiving unit configured to receive a packet generated by the adjacent terminal; and a determining unit configured to determine whether to relay the received packet or not, based on presence or absence of the record of packet relaying by the adjacent terminal.

In the second aspect of the present invention, the relay record managing unit may be configured to start to manage the record of packet relaying by the adjacent terminal when a packet relayed by the adjacent terminal is received.

In the second aspect of the present invention, the relay record managing unit may be configured to manage a record of data packet relaying by the adjacent terminal and a record of control packet relaying by the adjacent terminal, separately.

In the second aspect of the present invention, the determining unit may be configured to discard a control packet relayed by the adjacent terminal when there is no record of data packet relaying by the adjacent terminal.

In the second aspect of the present invention, the mobile terminal may include a request signal transmitting unit configured to transmit a request signal for requesting the adjacent terminal to manage the record of packet relaying.

BRIEF DESCRIPTION OF THE SEVERAL VIEWS OF THE DRAWINGS

FIG. 3 is a functional block diagram of a mobile terminal according to a first embodiment of the present invention;

FIGS. 4A and 4B are diagrams showing an example of a relay record management table in the mobile terminal according to the first embodiment of the present invention;

DETAILED DESCRIPTION OF THE INVENTION

First Embodiment of the Invention

Figure 1:
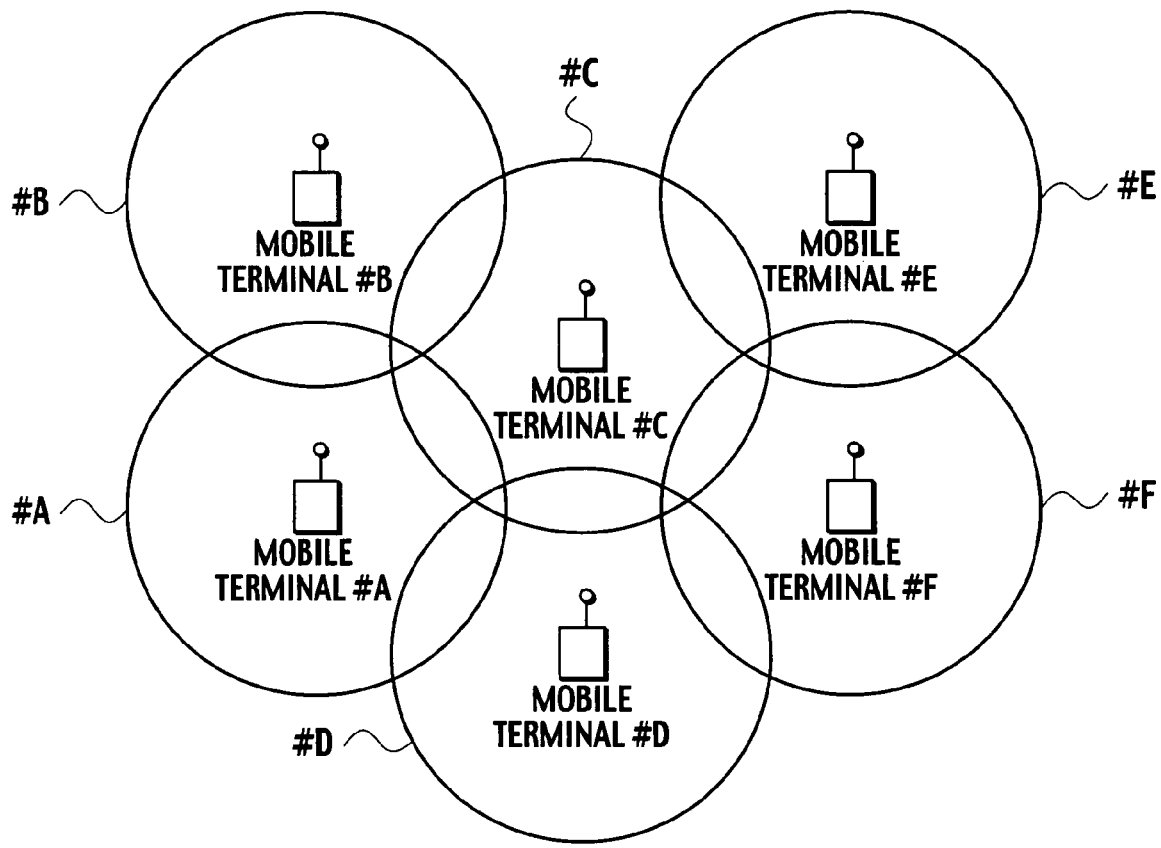
FIG. 1 is a diagram for illustrating a conventional method for avoiding being affected by an uncooperative terminal in an ad hoc network.
Figure 2:
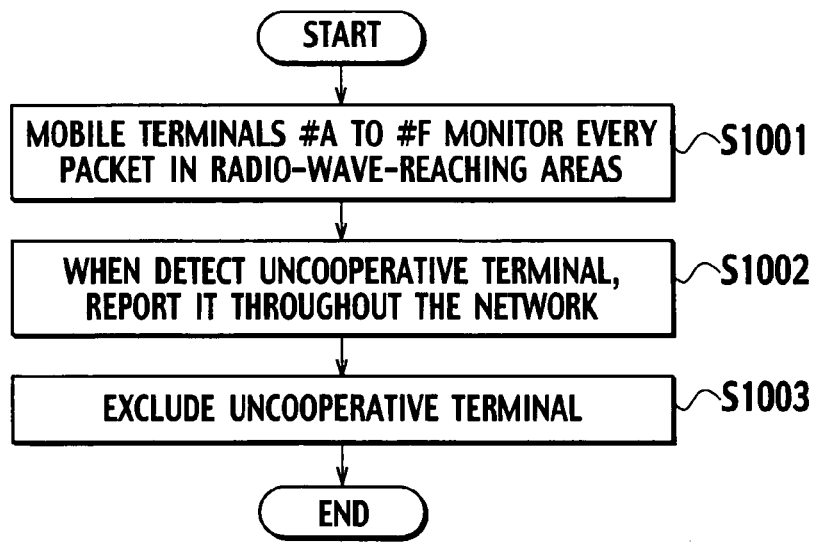
FIG. 2 is a flowchart showing a conventional operation of avoiding being affected by an uncooperative terminal in an ad hoc network.

With reference to FIGS. 3 to 7, a first embodiment of the present invention will be described. FIG. 3 shows functional blocks of a mobile terminal #A in this embodiment. The mobile terminal #A in this embodiment forms part of an ad hoc network shown in FIG. 4A.

As shown in FIG. 3, the mobile terminal #A in this embodiment includes a packet receiving unit 11, a relay record management table storage unit 12, a record checking unit 13, a packet relaying unit 14, and a packet discarding unit 15.

The packet receiving unit 11 is configured to receive a packet generated by a terminal adjacent to the mobile terminal #A in the ad hoc network (such as a mobile terminal #B in the example of FIG. 4A), and a packet relayed by the adjacent terminal.

The relay record management table storage unit 12 is configured to manage records of packet relaying by terminals adjacent to the mobile terminal #A.

Specifically, the relay record management table storage unit 12 is configured to manage a relay (cooperation) record management table which shows records of packet relaying by adjacent terminals in an area where radio waves from the mobile terminal #A reach.

The relay record management table is configured to store a record (CR: Cooperation Record) related to each adjacent terminal. The record is configured to associate a "mobile terminal ID" and a "relay record".

Here, the "mobile terminal ID" shows the ID of a mobile terminal, and the "relay record" shows whether a record of packet relaying by the mobile terminal is managed or not.

The relay record management table may be configured to only manage records related to mobile terminals whose packet relaying records are managed.

When mobile terminals are distributed in an area where radio waves from the mobile terminal #A reach as shown in FIG. 4A, and the mobile terminal #A manages records of packet relaying by the mobile terminals #B and #D, the relay record management table storage unit 12 manages the relay record management table including records as shown in FIG. 4B.

The record checking unit 13 is configured to determine whether to relay a packet received from an adjacent terminal or not, based on the presence or absence of a record of packet relaying by the adjacent mobile terminal.

That is, the record checking unit 13 is configured to determine that a packet received from an adjacent terminal be relayed when a record of packet relaying by the adjacent terminal is managed.

Figure 5A:
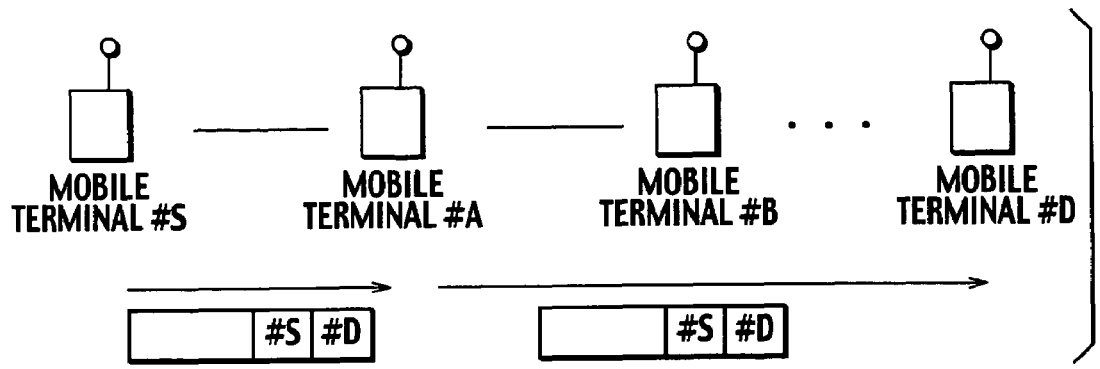
FIGS. 5A and 5B are diagrams for illustrating a function of a record checking unit of the mobile terminal according to the first embodiment of the present invention.

Specifically, as shown in FIG. 5A, when a record related to an adjacent terminal #S is managed in the relay record management table of the mobile terminal #A, the record checking unit 13 of the mobile terminal #A is configured to instruct the packet relaying unit 14 to relay a packet transmitted from the adjacent terminal #S (source terminal ID=#S, destination terminal ID=#D).

As shown in FIG. 5A, other mobile terminals (such as mobile terminal #B) are configured to relay a packet on which determination has once been made on whether to relay it or not by the mobile terminal #A, without again determining whether to relay it or not.

The record checking unit 13 is configured to determine that a packet received from an adjacent terminal be discarded when a record of packet relaying by the adjacent terminal is not managed.

Figure 5B:
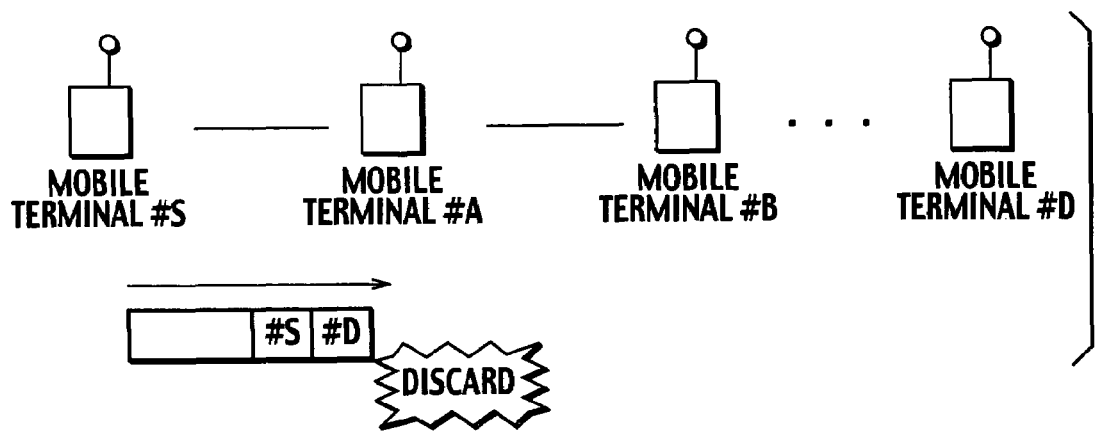

Specifically, as shown in FIG. 5B, when no record related to the adjacent terminal #S is managed in the relay record management table of the mobile terminal #A, the record checking unit 13 of the mobile terminal #A is configured to instruct the packet discarding unit 15 to discard the packet transmitted from the adjacent terminal #S (source terminal ID=#S, destination terminal ID=#D).

Also, the record checking unit 13 is configured to start to manage a record of packet relaying by an adjacent terminal when a packet relayed by the adjacent terminal is received.

Figure 6:
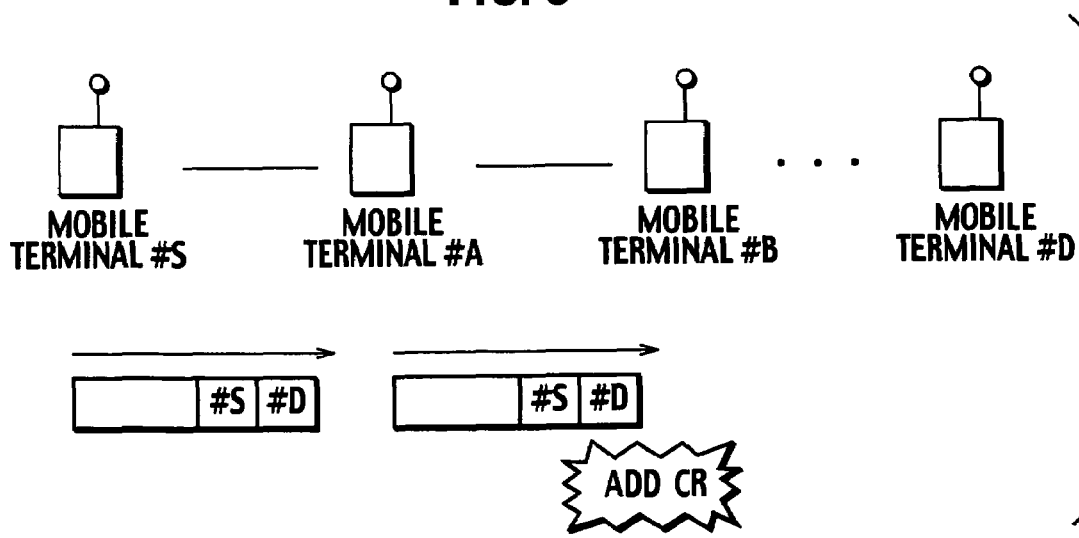
FIG. 6 is a diagram for illustrating a function of the record checking unit of the mobile terminal according to the first embodiment of the present invention.

Specifically, as shown in FIG. 6, the record checking unit 13 of the mobile terminal #B is configured to generate a record related to the adjacent terminal #A in the relay record management table upon reception of the packet transmitted from the adjacent terminal #A (source terminal ID=#S, destination terminal ID=#D), when a record related to the adjacent terminal #A is not managed in the relay record management table of the mobile terminal #B.

The packet relaying unit 14 is configured to relay a packet transmitted from an adjacent terminal to another adjacent terminal, according to an instruction from the record checking unit 13.

The packet discarding unit 15 is configured to discard a packet transmitted from an adjacent terminal, according to an instruction from the record checking unit 13.

With reference to FIG. 5, a routing method in the ad hoc network according to this embodiment will be described.

Hereinafter, an example of using "AODV routing" in the ad hoc network in this embodiment will be described, although the present invention is not limited to that case, and can also be applied to cases of using other routing methods in the ad hoc network in this embodiment.

In step S101, the mobile terminal #A receives a packet transmitted from the adjacent terminal #S.

In step S102, the mobile terminal #A determines whether the received packet is a relayed packet or not.

When the received packet is a packet generated by the adjacent terminal #S, the mobile terminal #A determines that the packet is not a relayed packet, and proceeds to processing in step S103.

On the other hand, when the received packet is a packet generated by a terminal other than the adjacent terminal #S, the mobile terminal #A determines that the packet is a relayed packet, and proceeds to processing in step S106.

In step S103, the mobile terminal #A determines whether a record related to the adjacent terminal #S is stored in the relay record management table or not.

When it is determined that the record is not stored, in step S104, the mobile terminal #A discards the packet.

Here, since the mobile terminal #A does not manage a record of packet relaying by the adjacent terminal #S, which might be an uncooperative terminal, the packet generated by the adjacent terminal #S is discarded.

On the other hand, when it is determined that the record is stored, in step S105, the mobile terminal #A relays the packet to the destination terminal ID (normal AODV operation).

In step S106, the mobile terminal #A determines whether a record related to the adjacent terminal #S is stored in the relay record management table or not.

When it is determined that the record is not stored, in step S107, the mobile terminal #A adds a record related to the adjacent terminal #S to the relay record management table.

When it is determined that the record is stored, in step S105, the mobile terminal #A relays the packet to the destination terminal ID (normal AODV operation).

According to the rouging method of this embodiment, a packet generated by a mobile terminal with no packet relay (cooperation) record is not relayed, whereby the effects of uncooperative terminals can be completely eliminated.

Also, according to the routing method of this embodiment, a plurality of mobile terminals forming an ad hoc network do not need to monitor every packet in the respective radio-wave-reaching areas, so that a processing load can be reduced.

Also, according to the routing method of this embodiment, since information on an uncooperative terminal does not need to be propagated throughout an ad hoc network, a network load is not increased.

In addition, according to the routing method of this embodiment, since information on an uncooperative terminal does not need to be shared and processed by all the mobile terminals in an ad hoc network, localization of processing can be achieved.

Second Embodiment of the Invention

Figures 7, 8:
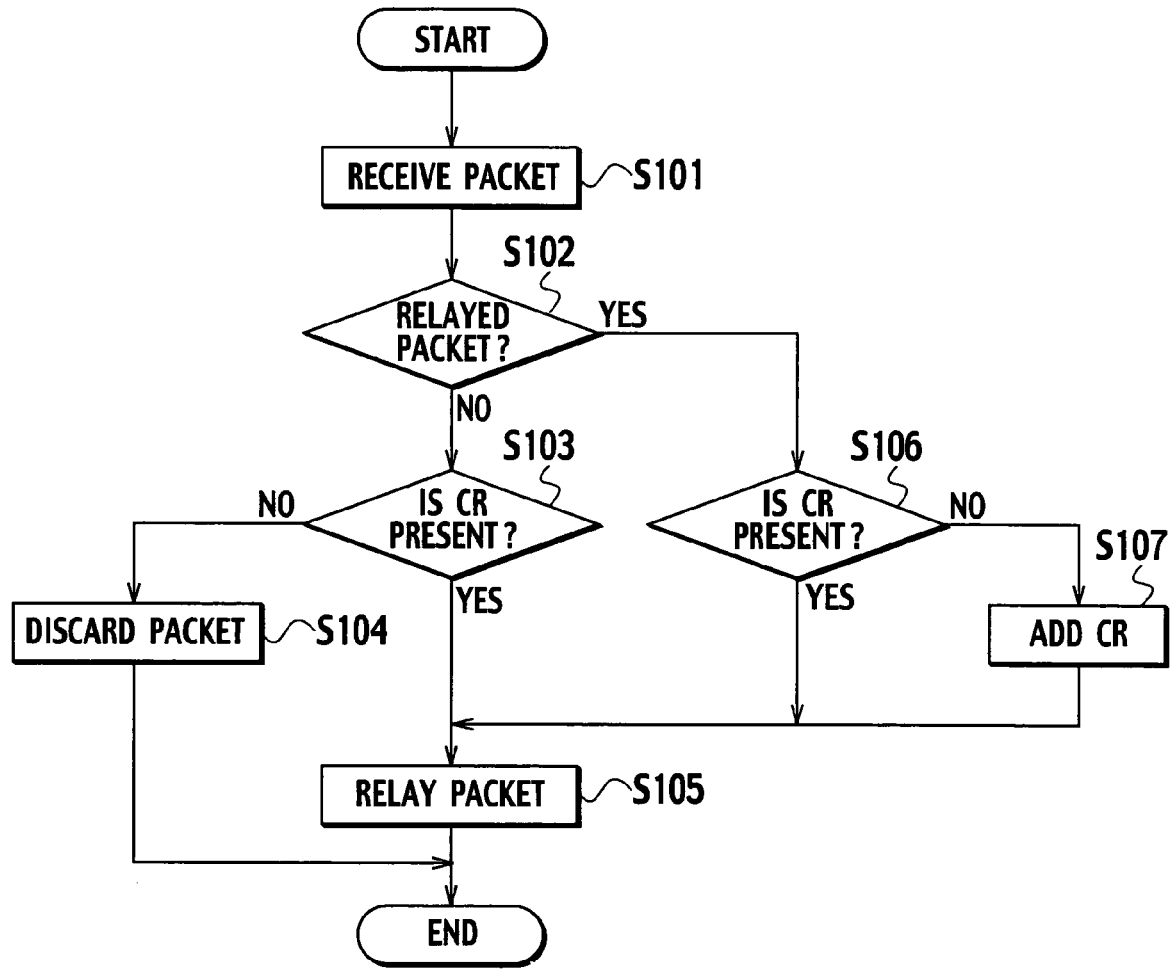
FIG. 7 is a flowchart showing a routing method according to the first embodiment of the present invention.
FIG. 8 is a diagram showing an example of a relay record management table in a mobile terminal according to a second embodiment of the present invention.
Figure 9:
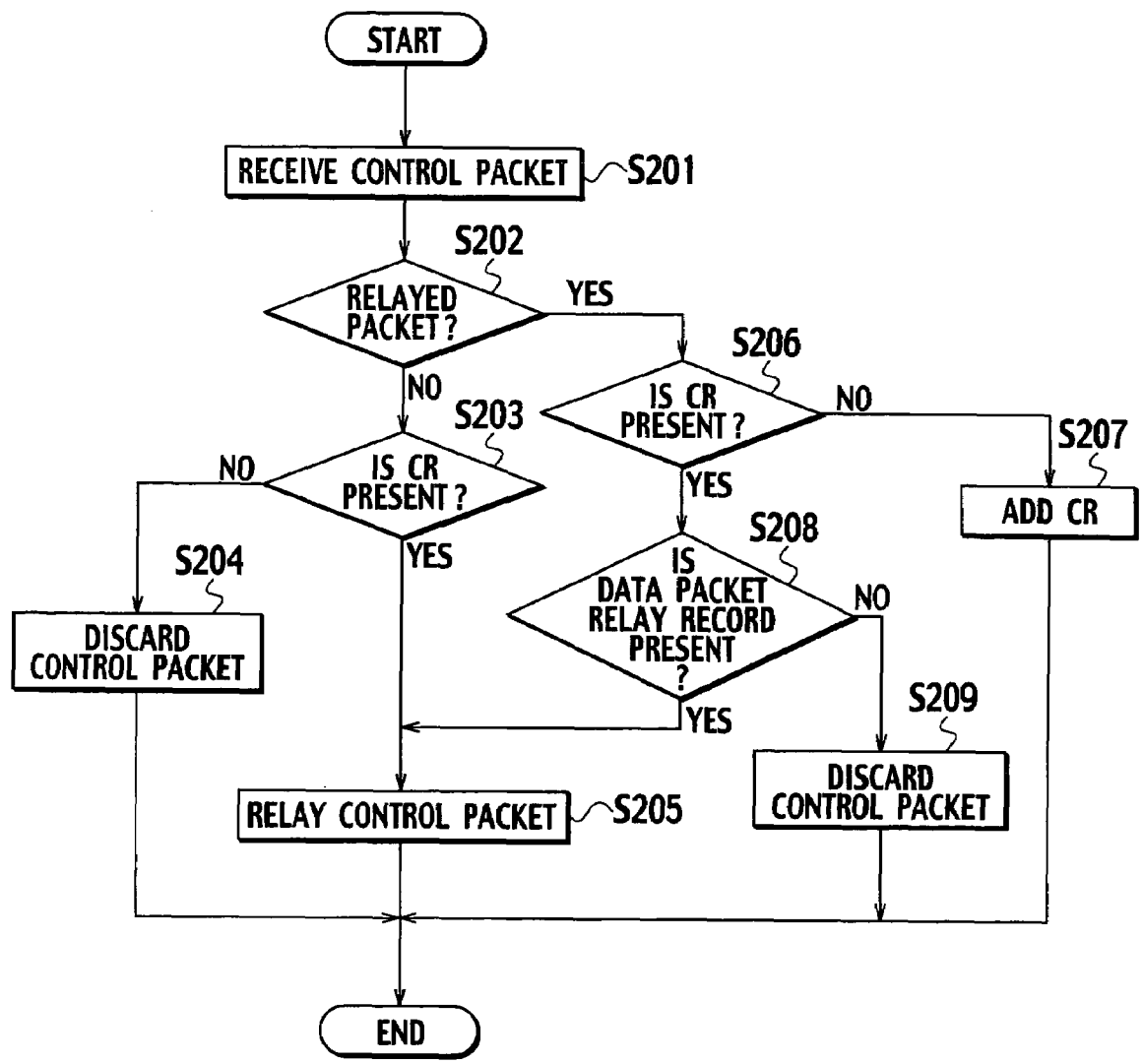
FIG. 9 is a flowchart showing a routing method according to the second embodiment of the present invention.
Figure 10:
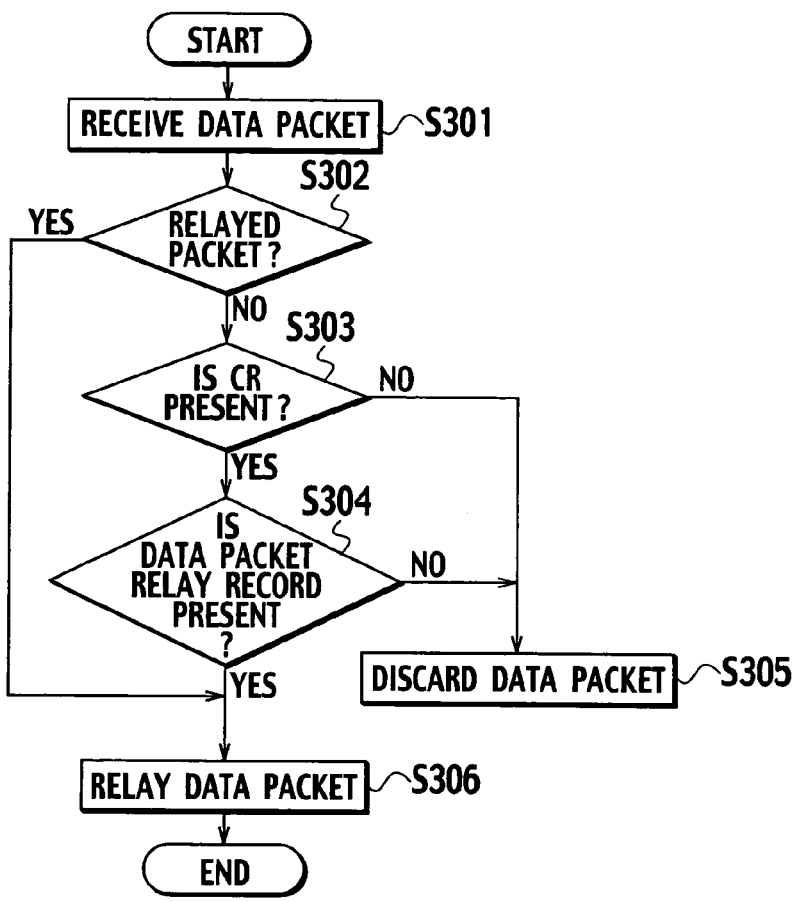
FIG. 10 is a flowchart showing a routing method according to the second embodiment of the present invention.

With reference to FIGS. 8 to 10, a second embodiment of the present invention will be described. This embodiment is identical to the above described first embodiment except that control packets and data packets are managed separately. Hereinafter, differences of this embodiment from the first embodiment will be mainly described.

A relay record management table storage unit 12 of a mobile terminal #A in this embodiment is configured to manage records of data packet relaying by adjacent terminals and records of control packet relaying by the adjacent terminals, separately.

Specifically, the relay record management table storage unit 12 is configured to manage a relay record management table including records which associate "mobile terminal IDs", "control packet relay records" and "data packet relay records", as shown in FIG. 8.

Here, a "mobile terminal ID" shows the ID of a mobile terminal, a "control packet relay record" shows whether a record of control packet relaying by the mobile terminal is managed or not, and a "data packet relay record" shows whether a record of data packet relaying by the mobile terminal is managed or not.

The relay record management table storage unit 12 may be alternatively configured to manage a relay record management table including records which associate "mobile terminal IDs" and "data packet relay records" (records not including "control packet relay records").

A record checking unit 13 of the mobile terminal #A in this embodiment is configured to discard a control packet relayed by an adjacent terminal when there is no record of data packet relaying by the adjacent terminal.

Next, with reference to FIGS. 9 and 10, a routing method in an ad hoc network according to this embodiment will be described.

First, with reference to FIG. 9, an operation of a mobile terminal when a control packet is routed in an ad hoc network in this embodiment will be described.

In step S201, the mobile terminal #A receives a control packet transmitted from an adjacent terminal #S.

In step S202, the mobile terminal #A determines whether the received control packet is a relayed packet or not.

When the received control packet is a packet generated by the adjacent terminal #S, the mobile terminal #A determines that the control packet is not a relayed packet, and proceeds to processing in step S203.

On the other hand, when the received control packet is a packet generated by a terminal other than the adjacent terminal #S, the mobile terminal #A determines that the control packet is a relayed packet, and proceeds to processing in step S206.

In step S203, the mobile terminal #A determines whether a record related to the adjacent terminal #S is stored in the relay record management table or not.

When it is determined that the record is not stored, in step S204, the mobile terminal #A discards the control packet.

On the other hand, when it is determined that the record is stored, in step S205, the mobile terminal #A relays the control packet to a destination terminal ID (normal AODV operation).

In step S206, the mobile terminal #A determines whether a record related to the adjacent terminal #S is stored in the relay record management table or not.

When it is determined that the record is not stored, in step S207, the mobile terminal #A adds a record related to the adjacent terminal #S to the relay record management table.

On the other hand, when it is determined that the record is stored, the mobile terminal #A determines whether "data packet relay record=present" is set in the record related to the adjacent terminal #S or not.

When "data packet relay record=present" is set, in step S205, the mobile terminal #A relays the control packet to a destination terminal ID (normal AODV operation).

On the other hand, when "data packet relay record=absent" is set, in step S209, the mobile terminal #A discards the control packet.

Second, with reference to FIG. 10, an operation of a mobile terminal when a data packet is routed in an ad hoc network in this embodiment will be described.

In step S301, the mobile terminal #A receives a data packet transmitted from the adjacent terminal #S.

In step S302, the mobile terminal #A determines whether the received data packet is a relayed packet or not.

When the received data packet is a packet generated by the adjacent terminal #S, the mobile terminal #A determines that the data packet is not a relayed packet, and proceeds to processing in step S303.

On the other hand, when the received data packet is a packet generated by a terminal other than the adjacent terminal #S, the mobile terminal #A determines that the data packet is a relayed packet, and in step S306, relays the data packet to a destination terminal ID (normal AODV operation).

In step S303, the mobile terminal #A determines whether a record related to the adjacent terminal #S is stored in the relay record management table or not.

When it is determined that the record is not stored, in step S305, the mobile terminal #A discards the data packet.

On the other hand, when it is determined that the record is stored, in step S304, the mobile terminal #A determines whether "data packet relay record=present" is set in the record related to the adjacent terminal #S or not.

When "data packet relay record=absent" is set, in step S305, the mobile terminal #A discards the data packet.

On the other hand, when "data packet relay record=present" is set, in step S306, the mobile terminal #A relays the data packet to a destination terminal ID (normal AODV operation).

According to this embodiment, the effect of a user's mobile terminal, among uncooperative terminals, which performs operation of discarding data packets generated by other mobile terminals can be eliminated.

Third Embodiment of the Invention

Figure 11:
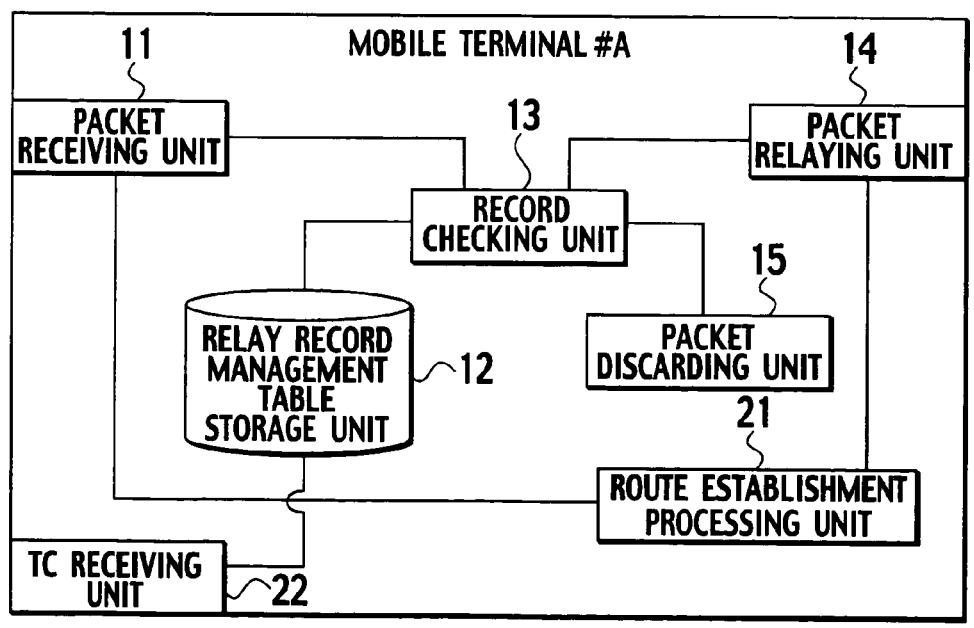
FIG. 11 is a functional block diagram of a mobile terminal according to a third embodiment of the present invention.
Figure 12:
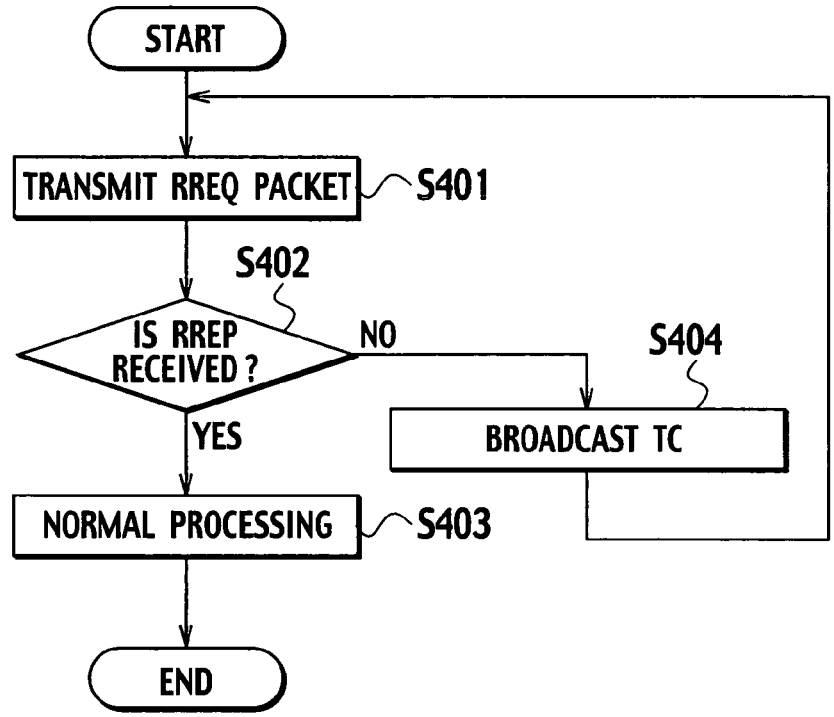
FIG. 12 is a flowchart showing an operation of the mobile terminal according to the third embodiment of the present invention.
Figure 13:
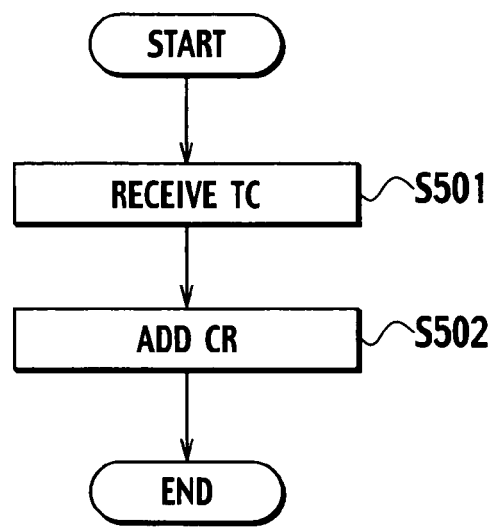
FIG. 13 is a flowchart showing an operation of the mobile terminal according to the third embodiment of the present invention.

With reference to FIGS. 11 to 13, a third embodiment of the present invention will be described. This embodiment is identical to the above-described first or second embodiment except that a mobile terminal #A includes a route establishment processing unit 21 and a TC receiving unit 22. Hereinafter, differences of this embodiment from the first or second embodiment will be mainly described.

As shown in FIG. 11, the mobile terminal #A of this embodiment is configured to include a route establishment processing unit 21 and a TC receiving unit 22 in addition to the components of the mobile terminal #A according to the first embodiment shown in FIG. 3.

The route establishment processing unit 21 is configured to perform processing for transmitting a RREQ packet to an adjacent terminal, thereby establishing a route for transmitting a packet generated by the mobile terminal #A to a destination terminal.

Also, the route establishment processing unit 21 is configured to transmit a request signal (TC) for requesting an adjacent terminal to manage a record of packet relaying by the mobile terminal #A, when a RREP packet in response to the RREQ packet cannot be received from the adjacent terminal by a timeout.

The TC receiving unit 22 is configured to instruct a relay record management table storage unit 12 to manage a record of packet relaying by an adjacent terminal for a predetermined period of time in response to a request signal (TC) transmitted from the adjacent terminal.

Next, with reference to FIGS. 12 and 13, an operation for the mobile terminal #A to establish a route for transmitting a packet through an adjacent terminal #B to a destination terminal #D in an ad hoc network according to the third embodiment of the present invention will be described.

First, with reference to FIG. 12, an operation of the mobile terminal #A in this case will be described.

As shown in FIG. 12, in step S401, the mobile terminal #A transmits a RREQ packet to the adjacent terminal #B.

When the mobile terminal #A receives a RREP packet from the adjacent terminal #B before a timeout, in step S403, it establishes a route for transmitting a packet through the adjacent terminal #B to the destination terminal #D by normal processing.

On the other hand, when the mobile terminal #A can not receive a RREP packet from the adjacent terminal #B before a timeout, in step S404, it broadcasts a request signal (TC) for requesting adjacent terminals to manage a record of packet relaying by the mobile terminal #A. Then, the operation returns to step S401.

However, if the mobile terminal #A does not receive a RREP packet again ("NO" in step S402) after transmitting the request signal (TC) (step S404) and retransmitting the RREQ packet (step S401), the operation is terminated without the request signal (TC) being transmitted again.

Second, with reference to FIG. 13, an operation of the adjacent terminal #B in this case will be described.

As shown in FIG. 13, in step S501, the adjacent terminal #B receives the request signal (TC) transmitted from the mobile terminal #A, and in step S502, it manages a record of packet relaying by the mobile terminal #A for a predetermined period of time.

After a lapse of the predetermined period of time, the adjacent terminal #B stops managing the record of packet relaying by the mobile terminal #A.

According to the present invention, a routing method which can allow only mobile terminals with packet relay (cooperation) records to join in an ad hoc network, thereby to avoid being affected by uncooperative terminals, and mobile terminals for implementing the routing method can be provided.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A routing method in an ad hoc network formed by a plurality of mobile terminals, comprising:

receiving, at a mobile terminal forming part of the ad hoc network, a packet from an adjacent terminal;

determining, at the mobile terminal, whether the received packet is a packet relayed from the adjacent terminal or a packet generated by the adjacent terminal based on an identifier of a source terminal included in the received packet;

determining, at the mobile terminal, whether or not to relay the received packet to another adjacent terminal, based on presence or absence of a record of packet relaying by the adjacent terminal when the received packet is the packet generated by the adjacent terminal; and relaying, at the mobile terminal, the received packet to the other adjacent terminal without determining whether or not to relay the received packet based on the presence or absence of a record of packet relaying by the adjacent terminal, when the received packet is the packet relayed by the adjacent terminal, wherein, in determining whether or not to relay the received packet generated by the adjacent terminal, determining to relay the received packet when the record is present, and not to relay the received packet when the record is absent.

2. The routing method as set forth in claim 1, further comprising: starting, at the mobile terminal, management of the record of packet relaying by the adjacent terminal when receiving a packet relayed by the adjacent terminal.

3. The routing method as set forth in claim 1, wherein the mobile terminal manages a record of data packet relaying by the adjacent terminal and a record of control packet relaying by the adjacent terminal, separately.

4. The routing method as set forth in claim 3, further comprising: discarding, at the mobile terminal, a control packet relayed by the adjacent terminal when there is no record of data packet relaying by the adjacent terminal.

5. The routing method as set forth in claim 1, further comprising:
   transmitting, at the adjacent terminal, a request signal for requesting the mobile terminal to manage a record of packet relaying by the adjacent terminal; and
   managing, at the mobile terminal, the record of packet relaying by the adjacent terminal for a predetermined period of time in response to the request signal.

6. A mobile terminal forming part of an ad hoc network, comprising:
   a relay record managing unit configured to manage a record of packet relaying by a terminal adjacent to the mobile terminal;
   a packet receiving unit configured to receive a packet from the adjacent terminal and determine whether the received packet is a packet relayed from the adjacent terminal or a packet generated by the adjacent terminal, based on an identifier of a source terminal included in the received packet; and a determining unit configured to determine whether or not to relay the received packet to an other adjacent terminal, based on presence or absence of the record of packet relaying by the adjacent terminal when the received packet is the packet generated by the adjacent terminal; and
   a relaying unit configured to relay the received packet to the other adjacent terminal without determining whether or not to relay the received packet based on the presence or absence of a record of packet relaying by the adjacent terminal, when the received packet is the packet relayed by the adjacent terminal;
   wherein the determining unit is configured to determine to relay the received packet generated by the adjacent terminal when the record is present, and not to relay the received packet when the record is absent.

7. The mobile terminal as set forth in claim 6, wherein the relay record managing unit is configured to start to manage the record of packet relaying by the adjacent terminal when a packet relayed by the adjacent terminal is received.

8. The mobile terminal as set forth in claim 6, wherein the relay record managing unit is configured to manage a record of data packet relaying by the adjacent terminal and a record of control packet relaying by the adjacent terminal, separately.

9. The mobile terminal as set forth in claim 8, wherein the determining unit is configured to discard a control packet relayed by the adjacent terminal when there is no record of data packet relaying by the adjacent terminal.

10. The mobile terminal as set forth in claim 6, further comprising a request signal transmitting unit configured to transmit a request signal for requesting the adjacent terminal to manage the record of packet relaying by the mobile terminal.

* * * * *